United States Patent
Lauridsen et al.

(10) Patent No.: US 12,438,600 B2
(45) Date of Patent: Oct. 7, 2025

(54) RANDOM ACCESS PROCEDURE SELECTION

(71) Applicant: NOKIA TECHNOLOGIES OY, Espoo (FI)

(72) Inventors: Mads Lauridsen, Gistrup (DK); Rafhael Medeiros De Amorim, Aalborg (DK); Jeroen Wigard, Klarup (DK); István Zsolt Kovács, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 532 days.

(21) Appl. No.: 17/799,586

(22) PCT Filed: Feb. 14, 2020

(86) PCT No.: PCT/EP2020/053974
§ 371 (c)(1),
(2) Date: Aug. 12, 2022

(87) PCT Pub. No.: WO2021/160292
PCT Pub. Date: Aug. 19, 2021

(65) Prior Publication Data
US 2023/0072679 A1    Mar. 9, 2023

(51) Int. Cl.
 H04W 74/0833    (2024.01)
 H04B 7/185    (2006.01)

(52) U.S. Cl.
 CPC .... *H04W 74/0833* (2013.01); *H04B 7/18513* (2013.01); *H04B 7/18541* (2013.01)

(58) Field of Classification Search
 CPC ........... H04B 7/18513; H04B 7/18541; H04W 74/0833; H04W 74/0836; H04W 74/0838
 See application file for complete search history.

(56) References Cited

U.S. PATENT DOCUMENTS

| | | | | |
|---|---|---|---|---|
| 2022/0086786 A1* | 3/2022 | Narasimha | ........ | H04W 56/0005 |
| 2022/0353922 A1* | 11/2022 | Rastegardoost | .. | H04W 36/0064 |

(Continued)

FOREIGN PATENT DOCUMENTS

| | | |
|---|---|---|
| EP | 0 637 142 A1 | 2/1995 |
| WO | 2016/179037 A1 | 11/2016 |

OTHER PUBLICATIONS

International Search Report and Written Opinion dated Nov. 9, 2020 corresponding to International Patent Application No. PCT/EP2020/053974.

*Primary Examiner* — Donald L Mills
(74) *Attorney, Agent, or Firm* — Barta Jones, PLLC

(57) ABSTRACT

According to an example embodiment, a client device comprises at least one processor; and at least one memory including computer program code. The at least one memory and the computer program code may be configured to, with the at least one processor, cause the client device to: detect need for random access, random access, in a non-terrestrial network to a target cell of the non-terrestrial network; identify whether the needed random access is intra-satellite or inter-satellite; in response to the needed random access being intra-satellite, perform a first random access procedure, wherein, in the first random access procedure, the client device transmits a random access preamble and a payload data in a single message; and in response to the needed random access being inter-satellite, perform a second random access procedure wherein, in the second random access procedure, the client device transmits a random access preamble and a payload data in separate messages. A client device, a network node device, methods and computer program products are disclosed.

16 Claims, 7 Drawing Sheets

(56) References Cited

U.S. PATENT DOCUMENTS

2023/0056778 A1* 2/2023 Lin .................. H04W 74/0833
2023/0344508 A1* 10/2023 Tseng ................. H04W 56/005

* cited by examiner

RANDOM ACCESS PROCEDURE SELECTION

TECHNICAL FIELD

The present application generally relates to the field of wireless communications. In particular, the present application relates to a client device and a network node device for wireless communication, and related methods and computer programs.

BACKGROUND

Non-terrestrial networks (NTN) may be implemented using, for example, Low Earth Orbit (LEO) satellites at altitudes of 500-1500 km. Each LEO satellite may provide new radio (NR) service on earth through one or more NR beams and NR cells. Due to the low altitude the satellites move with about 7.5 km/s relative to earth. Thus, client devices may need to perform Random Access (RA) procedure often due to, for example, handovers or switching to connected mode after cell (re-)selection. This may apply to RRC Connected and RRC Idle/Inactive client devices. Thus, any overhead in the RA procedure may have a significant effect on the performance of the NTN.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor and at least one memory comprising computer program code. The at least one memory and the computer program code are configured to, with the at least one processor, cause the client device to: detect need for random access in a non-terrestrial network to a target cell of the non-terrestrial network; identify whether the needed random access is intra-satellite or inter-satellite; in response to the needed random access being intra-satellite, perform a first random access procedure, wherein, in the first random access procedure, the client device transmits a random access preamble and a payload data in a single message; and in response to the needed random access being inter-satellite, perform a second random access procedure wherein, in the second random access procedure, the client device transmits a random access preamble and a payload data in separate messages. The client device may, for example, choose an appropriate random access procedure for different situations.

An example embodiment of a client device comprises means for performing: detect need for random access in a non-terrestrial network to a target cell of the non-terrestrial network; identify whether the needed random access is intra-satellite or inter-satellite; in response to the needed random access being intra-satellite, perform a first random access procedure, wherein, in the first random access procedure, the client device transmits a random access preamble and a payload data in a single message; and in response to the needed random access being inter-satellite, perform a second random access procedure wherein, in the second random access procedure, the client device transmits a random access preamble and a payload data in separate messages.

In an example embodiment, alternatively or in addition to the above-described example embodiments, the at least one memory and the computer program code are further configured to, with the at least one processor, cause the client device to: detect the need for random access based on need for a handover; and perform the needed handover using the first or the second random access procedure. The client device may, for example, choose an appropriate random access procedure based on the type of handover.

In an example embodiment, alternatively or in addition to the above-described example embodiments, the at least one memory and the computer program code are further configured to, with the at least one processor, cause the client device to detect the need for random access in response to the client device switching to a connected mode from an idle mode. The client device may, for example, choose an appropriate random access procedure after a cell reselection.

In an example embodiment, alternatively or in addition to the above-described example embodiments, the at least one memory and the computer program code are further configured to, with the at least one processor, cause the client device to identify whether the needed random access is intra-satellite or inter-satellite by performing at least one of: compare at least one identifier related to a previous cell and at least one identifier related to the target cell; compare reference signal receive power/quality of the previous cell and of the target cell; compare time synchronization of synchronization signals and/or reference signals and/or broadcast channels of the previous cell and of the target cell; or compare physical location and/or movement trajectory of the previous cell and of the target cell. The client device may, for example, choose an appropriate random access procedure using implicit signaling. Thus, needed signaling resources may be reduced.

In an example embodiment, alternatively or in addition to the above-described example embodiments, the at least one identifier comprises at least one of: cell global identifier, gNB identifier, global gNB identifier, physical cell identifier, satellite identification. The client device may, for example, efficiently choose an appropriate random access procedure using implicit signaling and network node device related identifiers.

In an example embodiment, alternatively or in addition to the above-described example embodiments, the at least one memory and the computer program code are further configured to, with the at least one processor, cause the client device to, in response to the first random access procedure failing a preconfigured number of times, perform the second random access procedure. The client device may, for example, fallback to using the second random access procedure if the first random access procedure fails.

In an example embodiment, alternatively or in addition to the above-described example embodiments, he at least one memory and the computer program code are further configured to, with the at least one processor, cause the client device to: transmit the random access preamble using physical random-access channel; and transmit the payload data using physical up-link shared channel. The client device may, for example, efficiently transmit the random access preamble and the payload data.

In an example embodiment, alternatively or in addition to the above-described example embodiments, the at least one memory and the computer program code are further configured to, with the at least one processor, cause the client device to: receive a configuration message from a network node device triggering the random access procedure; identify whether the needed random access is intra-satellite or inter-satellite based on the received configuration message. The client device may, for example, choose an appropriate random access procedure based on explicit signaling.

In an example embodiment, alternatively or in addition to the above-described example embodiments, the random access configuration message comprises dedicated bits indicating random access procedure to be used by the client device. The client device may, for example, choose an appropriate random access procedure using efficient explicit signaling.

In an example embodiment, alternatively or in addition to the above-described example embodiments, the at least one memory and the computer program code are further configured to, with the at least one processor, cause the client device to: before performing the first or the second random access procedure, perform time synchronization using a synchronization signal source external to the non-terrestrial network. The client device may, for example, synchronize transmission of the client device even without appropriate timing advance configurations.

An example embodiment of a method comprises: detecting need of a client device for random access in a non-terrestrial network to a target cell of the non-terrestrial network; identifying whether the needed random access is intra-satellite or inter-satellite; in response to the needed random access being intra-satellite, performing a first random access procedure, wherein, in the first random access procedure, the client device transmits a random access preamble and a payload data in a single message; and in response to the needed random access being inter-satellite, performing a second random access procedure wherein, in the second random access procedure, the client device transmits a random access preamble and a payload data in separate messages.

In an example embodiment, alternatively or in addition to the above-described example embodiments, the method further comprises: detecting the need for random access based on need for a handover; and performing the needed handover using the first or the second random access procedure.

In an example embodiment, alternatively or in addition to the above-described example embodiments, the method further comprises detecting the need for random access in response to the client device switching to a connected mode from an idle mode.

In an example embodiment, alternatively or in addition to the above-described example embodiments, identifying whether the needed random access is intra-satellite or inter-satellite comprises at least one of: comparing at least one identifier related to a previous cell and at least one identifier related to the target cell; comparing reference signal receive power/quality of the previous cell and of the target cell; comparing time synchronization of synchronization signals and/or reference signals and/or broadcast channels of the previous cell and of the target cell; or comparing physical location and/or movement trajectory of the previous cell and of the target cell.

In an example embodiment, alternatively or in addition to the above-described example embodiments, the at least one identifier comprises at least one of: cell global identifier, gNB identifier, global gNB identifier, physical cell identifier, satellite identification.

In an example embodiment, alternatively or in addition to the above-described example embodiments, the method further comprises, in response to the first random access procedure failing a preconfigured number of times, performing the second random access procedure.

In an example embodiment, alternatively or in addition to the above-described example embodiments, the method further comprises transmitting the random access preamble using physical random-access channel; and transmitting the payload data using physical uplink shared channel.

In an example embodiment, alternatively or in addition to the above-described example embodiments, the method further comprises receiving a configuration message from a network node device triggering the random access procedure; and identifying whether the needed random access is intra-satellite or inter-satellite based on the received configuration message.

In an example embodiment, alternatively or in addition to the above-described example embodiments, the random access configuration message comprises dedicated bits indicating random access procedure to be used by the client device.

In an example embodiment, alternatively or in addition to the above-described example embodiments, the method further comprises, before performing the first or the second random access procedure, performing time synchronization using a synchronization signal source external to the non-terrestrial network.

An example embodiment of a computer program product comprises program code configured to perform the method according to any of the above client device related example embodiments, when the computer program product is executed on a computer.

An example embodiment of a network node device comprises at least one processor and at least one memory comprising computer program code. The at least one memory and the computer program code are configured to, with the at least one processor, cause the network node device to: receive information related to a target cell of a non-terrestrial network from a client device needing random access to the target cell; identify whether the random access is intra-satellite or inter-satellite based at least on the received information; in response to the needed random access being intra-satellite, transmit a configuration message to the client device instructing the client device to perform a first random access procedure, wherein, in the first random access procedure, the client device transmits a random access preamble and a payload data in a single message; and in response to the needed random access being inter-satellite, transmit a configuration message to the client device instructing the client device to perform a second random access procedure, wherein, in the second random access procedure, the client device transmits a random access preamble and a payload data in separate messages. The network node device may, for example, deduce and signal an appropriate random access procedure to be used by the client device.

An example embodiment of a network node device comprises means for performing: receive information related to a target cell of a non-terrestrial network from a client device needing random access to the target cell; identify whether the random access is intra-satellite or inter-satellite based at least on the received information; in response to the needed random access being intra-satellite, transmit a configuration message to the client device instructing the client device to perform a first random access procedure, wherein, in the first random access procedure, the client device transmits a random access preamble and a payload data in a single message; and in response to the needed random access being inter-satellite, transmit a configuration message to the client device instructing the client device to perform a second random access procedure, wherein, in the second random access procedure, the client device transmits a random access preamble and a payload data in separate messages.

In an example embodiment, alternatively or in addition to the above-described example embodiments, the information related to the target cell comprises reference signal received power, RSRP, measurement results. The network node device may, for example, deduce an appropriate random access procedure to be used by the client device based on the measurement results.

In an example embodiment, alternatively or in addition to the above-described example embodiments, the at least one memory and the computer program code are further configured to, with the at least one processor, cause the network node device to: in response to detecting the random access preamble and not detecting the payload data transmitted by the client device during the first random access procedure, transmit a fallback response message to the client device instructing the client device to perform the second random access procedure. The network node device may, for example, indicate to the client device to fallback to using the second random access procedure in the case that the first random access procedure fails.

In an example embodiment, alternatively or in addition to the above-described example embodiments, the at least one memory and the computer program code are further configured to, with the at least one processor, cause the network node device to: receive the random access preamble using physical random-access channel; and receive the payload data using physical uplink shared channel. The network node device may, for example, efficiently receive the random access preamble and the payload data.

An example embodiment of a method comprises: receiving information related to a target cell of a non-terrestrial network, from a client device needing random access to the target cell; identifying whether the random access is intra-satellite or inter-satellite based at least on the received information; in response to the needed random access being intra-satellite, transmitting a configuration message to the client device instructing the client device to perform a first random access procedure, wherein, in the first random access procedure, the client device transmits a random access preamble and a payload data in a single message; and in response to the needed random access being inter-satellite, transmitting a configuration message to the client device instructing the client device to perform a second random access procedure, wherein, in the second random access procedure, the client device transmits a random access preamble and a payload data in separate messages.

In an example embodiment, alternatively or in addition to the above-described example embodiments, the information related to the target cell comprises reference signal received power, RSRP, measurement results.

In an example embodiment, alternatively or in addition to the above-described example embodiments, the method further comprises, in response to detecting the random access preamble and not detecting the payload data transmitted by the client device during the first random access procedure, transmitting a fallback response message to the client device instructing the client device to perform the second random access procedure.

In an example embodiment, alternatively or in addition to the above-described example embodiments, the method further comprises receiving the random access preamble using physical random-access channel; and receiving the payload data using physical uplink shared channel.

An example embodiment of a computer program product comprises program code configured to perform the method according to any of the above network node device related example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
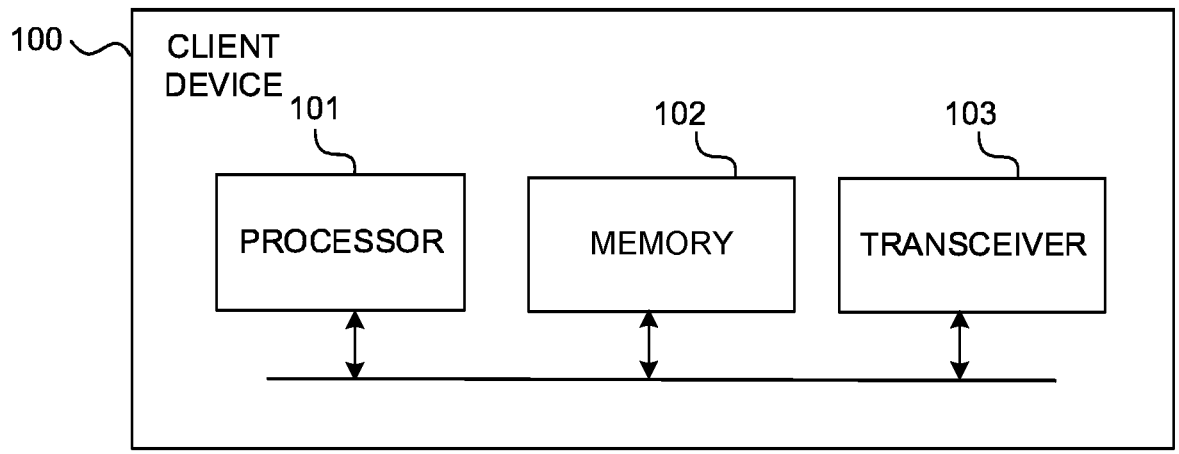
FIG. 1 illustrates an example embodiment of the subject matter described herein illustrating a client device.

FIG. 1 is a block diagram of a client device 100 configured in accordance with an example embodiment.

The client device 100 may comprises one or more processors 101 and one or more memories 102 that comprise computer program code. The client device 100 may also comprise a transceiver 103, as well as other elements, such as an input/output module (not shown in FIG. 1), and/or a communication interface (not shown in FIG. 1).

According to an example embodiment, the at least one memory 102 and the computer program code are configured to, with the at least one processor 101, cause the client device 100 to detect need for random access (RA) in a non-terrestrial network, NTN, to a target cell of the NTN.

The client device 100 may detect the need for RA based on need for a handover and perform the needed handover using the first or the second RA procedure.

The client device 100 may detect the need for RA in response to the client device 100 switching to a connected mode from an idle mode.

Connected mode may correspond to, for example, radio resource control (RRC) connected mode. Idle mode may correspond to, for example, RRC Idle/Inactive mode.

The client device 100 may detect the need for RA base on initial access from radio resource control (RRC)_IDLE.

Alternatively or additionally, the client device 100 may detect the need for RA in response to RRC Connection Re-establishment procedure.

Alternatively or additionally, the client device 100 may detect the need for RA in response to downlink (DL) or uplink (UL) data arrival during RRC_CONNECTED when UL synchronization status is "non-synchronized".

Alternatively or additionally, the client device 100 may detect the need for RA in response to UL data arrival during RRC_CONNECTED when there are no physical uplink control channel (PUCCH) resources for a service request (SR) available.

Alternatively or additionally, the client device 100 may detect the need for RA in response to SR failure.

Alternatively or additionally, the client device 100 may detect the need for RA in response to a request by RRC upon synchronous reconfiguration (e.g. handover).

Alternatively or additionally, the client device 100 may detect the need for RA in response to transition from RRC_INACTIVE.

Alternatively or additionally, the client device 100 may detect the need for RA in response to establishment of time alignment (TA) for a secondary timing advance group (TAG).

Alternatively or additionally, the client device 100 may detect the need for RA in response to a request for other system information (SI).

Alternatively or additionally, the client device 100 may detect the need for RA in response to beam failure recovery.

In the case that the client device 100 is, for example, RRC connected, the previous cell may correspond to a serving cell of the client device 100 before a handover. On the other hand, if the client device 100 is Idle/Inactive, the target cell may correspond to a camping cell of the client device 100.

The client device 100 may identify whether the needed RA is intra-satellite or inter-satellite.

If the target cell of the RA is provided by a different satellite than the previous cell the client device 100 was active in, the client device 100 may identify the RA as inter-satellite.

The previous cell the client device 100 was active in may refer to a previous cell the client device 100 had data exchange with. The client device 100 may have been connected to the previous cell, for example, before a handover or before a cell reselection.

If the target cell of the RA is provided by the same satellite as the previous cell the client device 100 was active in, the client device may identify the RA as intra-satellite.

Intra-satellite RA may refer to a situation where the previous cell and the target cell are provided by the same satellite. On the other hand, inter-satellite RA may refer to a situation where the previous cell and the target cell are provided by two different satellites. The each of the satellites may comprise a network node device, such as a gNB (regenerative satellite payload). Alternatively, each of the satellites may act as relay for network signals from the same network device, such as gNB (transparent satellite payload).

Herein, "previous cell" may refer to a previous/last cell that the client device 100 was last active in. Thus, the previous cell may be a previous/last cell that the client device 100 had data exchange with.

The client device 100 may identify whether the needed RA is intra-satellite or inter-satellite based on, for example, explicit signaling from a network node device or based on other implicit information, such as measurements. Example embodiments are disclosed herein.

The client device 100 may, in response to the needed RA being intra-satellite, perform a first RA procedure, wherein, in the first RA procedure, the client device transmits an RA preamble and a payload data in a single message.

The first RA procedure may also be referred to as a 2-step RA procedure or similar.

The client device 100 may transmit the single message comprising the RA preamble and the payload data to, for example, a network node device.

In the first RA procedure, the client device 100 may also receive an RA response and a connection setup message in a single message. The client device 100 may receive the message comprising the RA preamble and the connection setup message from, for example, a network node device.

The client device 100 may, in response to the needed RA being inter-satellite, perform a second RA procedure wherein, in the second RA procedure, the client device transmits an RA preamble and a payload data in separate messages.

The second RA procedure may also be referred to as a 4-step RA procedure.

The client device 100 may transmit the RA preamble and the payload data to, for example, a network node device.

In the second RA procedure, the client device 100 may also receive an RA response and a connection setup message in separate messages. The client device 100 may receive the RA response and the connection setup message from, for example, a network node device.

Although the client device 100 may be depicted to comprise only one processor 101, the client device 100 may comprise more processors. In an example embodiment, the memory 102 is capable of storing instructions, such as an operating system and/or various applications.

Furthermore, the processor 101 is capable of executing the stored instructions. In an example embodiment, the processor 101 may be embodied as a multi-core processor, a single core processor, or a combination of one or more multi-core processors and one or more single core processors. For example, the processor 101 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 101 may be configured to execute hard-coded functionality. In an example embodiment, the processor 101 is embodied as an executor of software instructions, wherein the instructions may specifically configure the processor 101 to perform the algorithms and/or operations described herein when the instructions are executed.

The memory 102 may be embodied as one or more volatile memory devices, one or more non-volatile memory devices, and/or a combination of one or more volatile memory devices and non-volatile memory devices. For example, the memory 102 may be embodied as semiconductor memories (such as mask ROM, PROM (programmable ROM), EPROM (erasable PROM), flash ROM, RAM (random access memory), etc.).

The client device 100 may include e.g. a mobile phone, a smartphone, a tablet computer, a smart watch, or any handheld or portable device or any other apparatus, such as a vehicle, a robot, or a repeater. The client device 100 may also be referred to as a user equipment (UE).

When the client device 100 is configured to implement some functionality, some component and/or components of the client device 100, such as the at least one processor 101 and/or the memory 102, may be configured to implement this functionality. Furthermore, when the at least one processor 101 is configured to implement some functionality, this functionality may be implemented using program code comprised, for example, in the memory 102. For example, if the client device 100 is configured to perform an operation, the at least one memory 102 and the computer program code can be configured to, with the at least one processor 101, cause the client device 100 to perform that operation.

Figure 2:
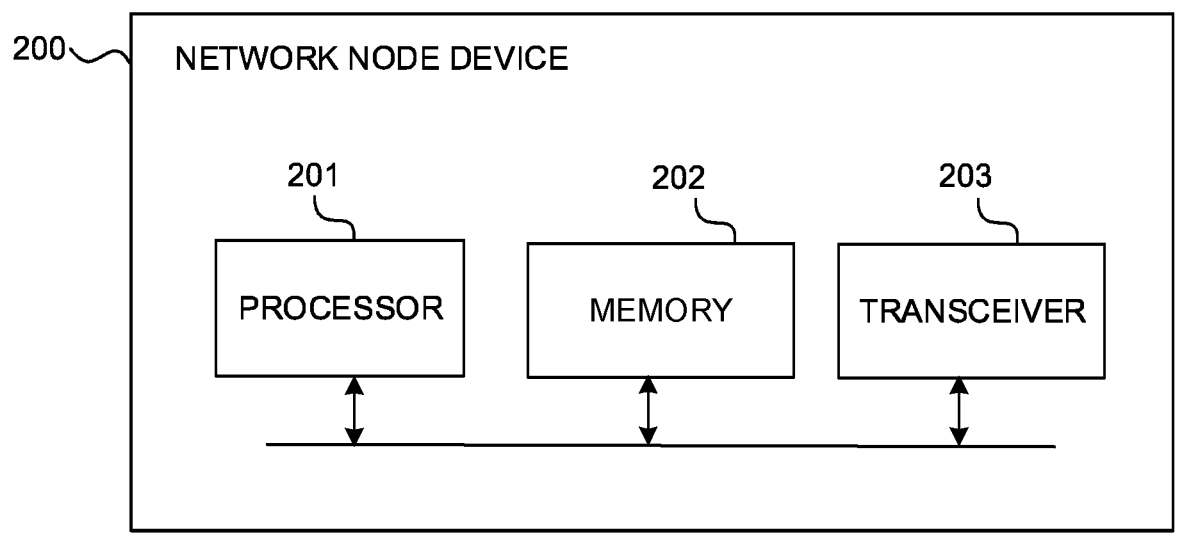
FIG. 2 illustrates an example embodiment of the subject matter described herein illustrating a network node device.

FIG. 2 is a block diagram of a network node device 200 in accordance with an example embodiment.

The network node device 200 may comprise one or more processors 201, and one or more memories 202 that comprise computer program code. The network node device 200 may also comprise a transceiver 203, as well as other elements, such as an input/output module (not shown in FIG. 2), and/or a communication interface (not shown in FIG. 2).

According to an example embodiment, the at least one memory 202 and the computer program code are configured to, with the at least one processor 201, cause the network node device 200 to receive information related to a target cell of a non-terrestrial network, NTN, from a client device needing random access (RA) to the target cell.

The network node device 200 may identify whether the needed RA is intra-satellite or inter-satellite based at least on the received information.

Additionally, the network node device 200 may also use other information to identify whether the needed RA is intra-satellite or inter-satellite. For example, the received information may comprise a measurement report. The measurement report may comprise measurement reports for the previous cell and the target cell. The network node device 200 may then use the measurement report and knowledge about cell to satellite mapping to identify whether the needed RA is intra-satellite or inter-satellite. The network node device 200 may receive or obtain the information or the cell to satellite mapping from, for example, the client device 100, another network node device, or some other network node in the core network.

The network node device 200 may, in response to the needed RA being intra-satellite, transmit a configuration message to the client device instructing the client device to perform a first random access, RA, procedure, wherein, in the first RA procedure, the client device transmits an RA preamble and a payload data in a single message.

The network node device 200 may, in response to the needed RA being inter-satellite, transmit a configuration message to the client device instructing the client device to perform a second RA procedure, wherein, in the second RA procedure, the client device transmits an RA preamble and a payload data in separate messages.

Although the network node device 200 is depicted to comprise only one processor 201, the network node device 200 may comprise more processors. In an example embodiment, the memory 202 is capable of storing instructions, such as an operating system and/or various applications.

Furthermore, the processor 201 is capable of executing the stored instructions. In an example embodiment, the processor 201 may be embodied as a multi-core processor, a single core processor, or a combination of one or more multi-core processors and one or more single core processors. For example, the processor 201 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 201 may be configured to execute hard-coded functionality. In an example embodiment, the processor 201 is embodied as an executor of software instructions, wherein the instructions may specifically configure the processor 201 to perform the algorithms and/or operations described herein when the instructions are executed.

The memory 202 may be embodied as one or more volatile memory devices, one or more non-volatile memory devices, and/or a combination of one or more volatile memory devices and non-volatile memory devices. For example, the memory 202 may be embodied as semiconductor memories (such as mask ROM, PROM (programmable ROM), EPROM (erasable PROM), flash ROM, RAM (random access memory), etc.).

The network node device 200 may be a base station. The base station may comprise, for example, a gNB or any such device providing an air interface for client devices 100 to connect to the wireless network via wireless transmissions. The network node device 200 may also be referred to as non-terrestrial network node device, base station, a gNB, a satellite-gNB, a satellite, or similar.

Further features of the network node device 200 directly result from the functionalities and parameters of the client device 100.

When the network node device 200 is configured to implement some functionality, some component and/or components of the network node device 200, such as the at least one processor 201 and/or the memory 202, may be configured to implement this functionality. Furthermore, when the at least one processor 201 is configured to implement some functionality, this functionality may be implemented using program code comprised, for example, in the memory 202. For example, if the network node device 200 is configured to perform an operation, the at least one memory 202 and the computer program code can be configured to, with the at least one processor 201, cause the network node device 200 to perform that operation.

Some terminology used herein may follow the naming scheme of 4G or 5G technology in its current form. However, this terminology should not be considered limiting, and the terminology may change over time. Thus, the following discussion regarding any example embodiment may also apply to other technologies.

Figure 3:
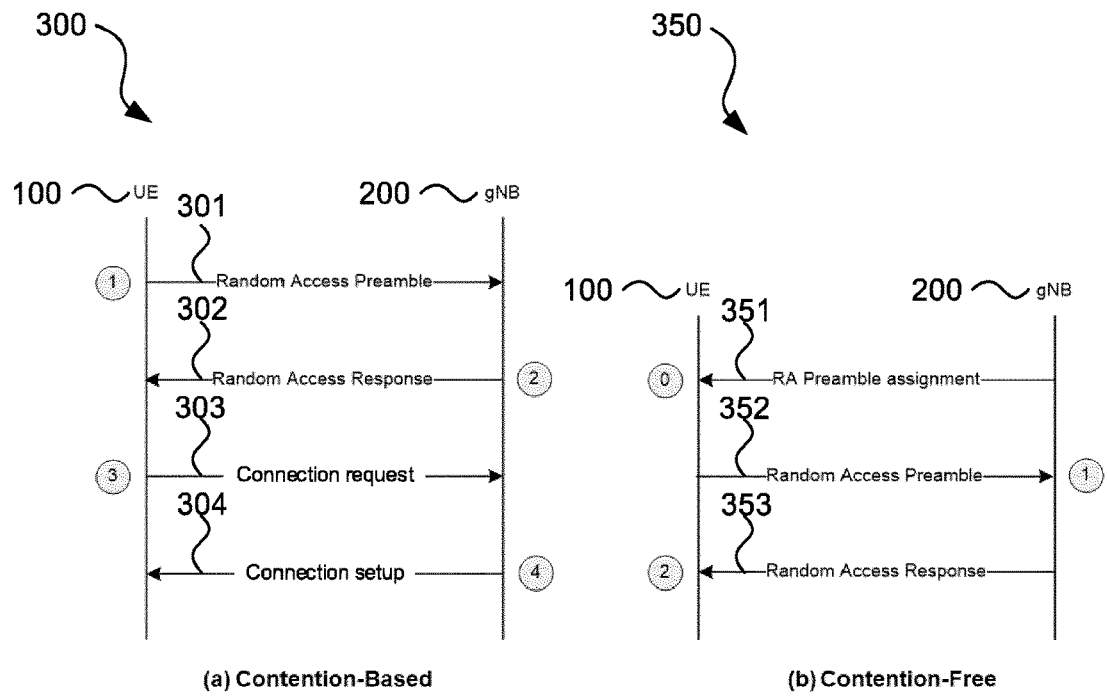
FIG. 3 illustrates an example embodiment of the subject matter described herein illustrating two signaling diagrams.

FIG. 3 illustrates two RA procedure signaling diagrams according to example embodiments.

The first signaling diagram 300 illustrates an example embodiment of a contention-based random access (RA) procedure between a client device 100 and a network node device 200. This procedure may be referred to as a 4-step RA procedure.

In the contention-based procedure, the client device 100 may transmit an RA preamble 301 to the network node device 200.

In response to receiving the RA preamble 301, the network node device 200 may transmit an RA response 302 to the client device 100.

The client device 100 may transmit the payload data 303 in a separate message in response to receiving the RA response 302 from the network node device 200. The transmission of the payload data 303 may be referred to as a scheduled transmission.

After receiving the payload data 303, the network node device 200 may perform connection setup 304.

According to an example embodiment, the at least one memory 102 and the computer program code are further configured to, with the at least one processor 101, cause the client device 100 to transmit the RA preamble 301 using physical random-access channel (PRACH) and to transmit the payload data 303 using physical uplink shared channel (PUSCH).

According to an example embodiment, the at least one memory 202 and the computer program code are further configured to, with the at least one processor 201, cause the network node device to 200 receive the RA preamble 302 using physical random-access channel, PRACH and receive the payload data 303 using physical uplink shared channel PUSCH.

The client device 100 and/or the network node device 200 may perform the 4-step RA procedure according to 3GPP Release 15 NR standard.

Alternatively or additionally, the client device 100 and/or the network node device 200 may perform the 4-step RA procedure with an extended preamble sequence according to 3GPP Release 17 NR standard.

The second signaling diagram 350 illustrates an example embodiment of a contention-free RA procedure between a client device 100 and a network node device 200. This procedure may be referred to as 1+2-step RA procedure.

The network node device 200 may transmit an RA preamble assignment message 351 to client device 100. Then the client device 100 may transmit the RA preamble 352 and receive the RA response 353 transmitted by the network node device 200.

For NTN, it may be beneficial to change the RA preambles 301, 352 to handle large propagation distances between the client device 100 and the network node device 200 and fast satellite movement.

At least some example embodiment disclosed herein may address problems related to Random Access procedures in non-terrestrial networks (NTN).

If contention-free RA is used, but the RA procedure is not successful, the client device 100 may postpone a new RA transmission according to a back-off timer. Depending on channel quality (according to an reference signal received power (RSRP) threshold for the Synchronization Signal and physical broadcast channel (PBCH) blocks (SSBs), where the RA is supposed to be send) the client device 100 may choose to attempt contention-free RA again or fallback to contention-based RA.

Figure 4:
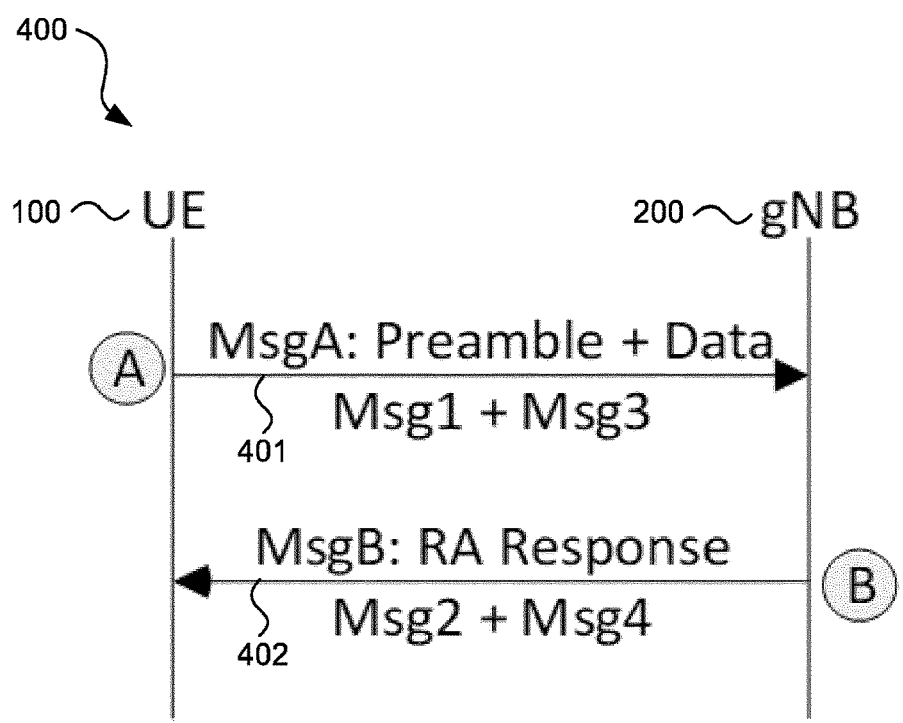
FIG. 4 illustrates an example embodiment of the subject matter described herein illustrating another signaling diagram.

FIG. 4 illustrates an RA procedure signaling diagram according to an example embodiment.

Signaling diagram 400 illustrates an example embodiment of a contention-based RA procedure between a client device 100 and a network node device 200. This procedure may be referred to as 2-step RA procedure.

The client device 100 and/or the network node device 200 may perform the 2-step RA procedure according to 3GPP Release 16 NR standard.

Comparing with the example embodiment of FIG. 3, it can be observed that message MsgA 401 of the 2-step RA procedure comprises of the RA preamble 301 and the payload data 303 of the 4-step RA procedure, while message MsgB comprises the RA response 302 and the connection setup message 304.

One advantage of the 2-step procedure may be that the RA procedure may be completed in 2 steps. For NTN, this may entail lower delay in setting up the convection, because the propagation distance (satelliteEarth) results in one-way delays of multiple milliseconds. A drawback of the 2-step RA procedure may be that the network needs to allocate not only resources for the RA preamble 301, but also for the payload data 303. Furthermore, the full MsgA 401 may be sent before the client device 100 has received a Timing Advance (TA) command and thus the uplink transmission may not be time aligned. Due to the missing time alignment and the long propagation delays, the MsgA 401 resources may need to be reserved with a large guard time.

According to an example embodiment, the at least one 102 memory and the computer program code are further configured to, with the at least one processor 101, cause the client device 100 to in response to the first RA procedure failing a preconfigured number of times, perform the second RA procedure. The first RA procedure may fail, for example, if the network node device 200 does not acknowledge the transmission of the message comprising the RA preamble and the payload data. Thus, the client device 100 may fallback to using the second RA procedure, if the first RA procedure fails a preconfigured number of times.

The 2-step RA may have a number of fallback methods. For example, if n transmissions of MsgA 401 are not acknowledged by the network, the client device 100 may fallback to using to the 4-step RA.

According to an example embodiment, the at least one memory 202 and the computer program code are further configured to, with the at least one processor 201, cause the network node device 200 to, in response to detecting the RA preamble and not detecting the payload data transmitted by the client device 100 during the first RA procedure, transmit a fallback response message to the client device instructing the client device to perform the second RA procedure.

For example, if the network is able to detect the PRACH part of MsgA 401 but not the PUSCH part, it may respond with a fallback response, which triggers 4-step RA procedure.

The 2-step RA procedure may be used if, for example, Reference Signal Received Power (RSRP) and/or Reference Signal Received Quality (RSRQ) measured by the client device 100 exceeds a preconfigured threshold. If the threshold is not exceeded, the client device 100 may need to apply the 4-step RA procedure. If contention-free resources are configured, the client device 100 may apply that RA procedure if the RSRP/RSRQ of the SSB(s) where the resources are scheduled exceed a preconfigured threshold. However, from NTN perspective, the RSRP/RSRQ may not vary much due to the altitude of the satellite and thus RSRP/RSRQ may not be a good implicit trigger for RA selection.

Figure 5:
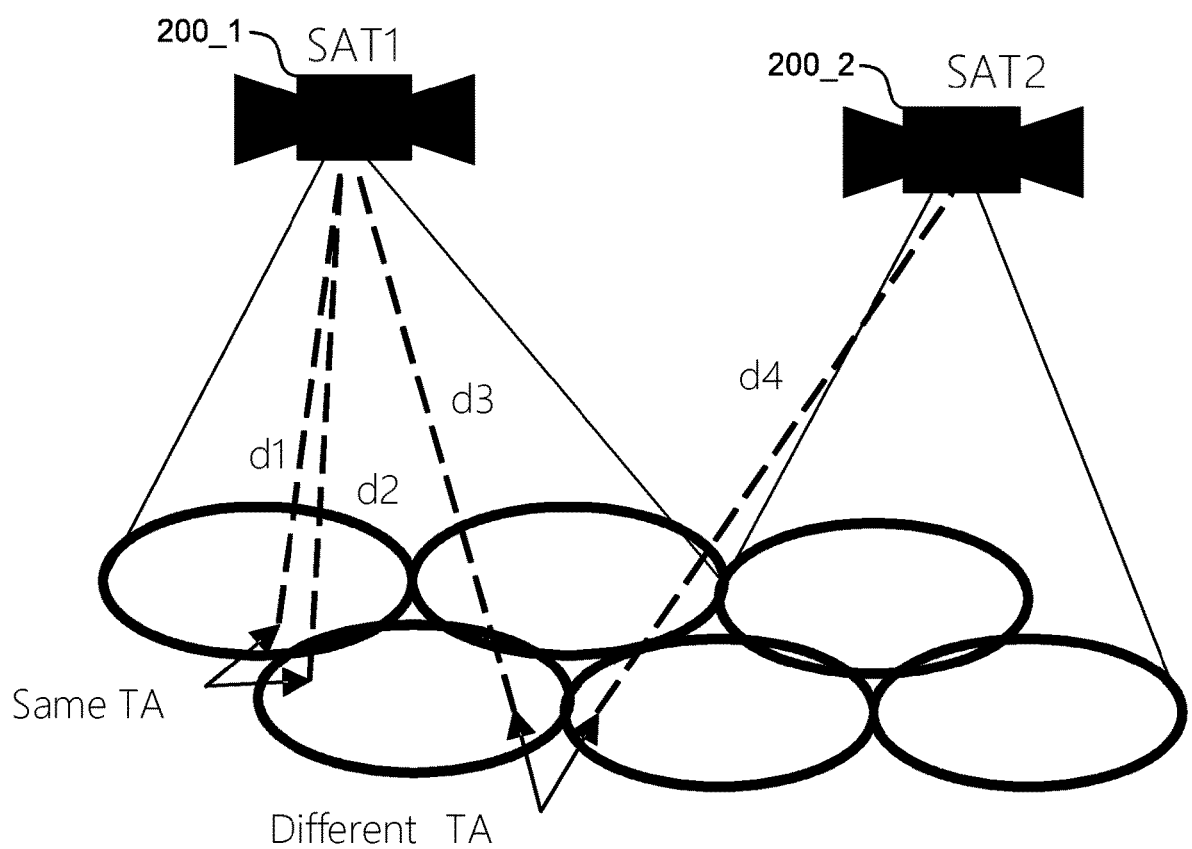
FIG. 5 illustrates an example embodiment of the subject matter described herein illustrating an example system, where various example embodiments of the present disclosure may be implemented.

FIG. 5 illustrates two satellites each comprising a network node device 200_1, 200_2 according to an example embodiment. The network node devices 200_1, 200_2 may be part of an NTN.

In NTN, Low Earth Orbit (LEO) satellites at altitudes of 500-1500 km may provide NR service on earth through one or more NR beams and NR cells. Due to the low altitude the satellites move with about 7.5 km/s relative to earth.

NR cells in an NTN may be earth-fixed or earth-moving. The former entails the satellite continuously adjusting the satellite beam pointing direction to fix the NR cell and NR beam to a specific point on earth, while the latter option entails the satellite beam pointing direction is fixed and thus the beam footprint (i.e. NR cell) is moving on earth. The satellite may be regenerative (gNB onboard the satellite) or transparent (gNB on earth, satellite as relay).

Independent of whether the NR cells are earth-fixed or earth-moving the client device 100 may need to perform the RA procedure often due to, for example, handovers or switching to connected mode after cell (re-)selection, which applies to RRC Connected and RRC Idle/Inactive client devices 100, respectively. In case of earth-fixed cells, when one satellite can no longer provide coverage and another satellite is switching its beam to the area, the client device 100 may be instructed to handover. In case of the earth-moving cells the client device 100 may be instructed to handover when the cell edge is approaching the client device 100.

When a client device 100 performs, for example, a handover or cell reselection, the change in TA may depend at least on whether the target cell is generated from the same satellite as the serving cell. The example embodiment of FIG. 5 provides conceptual illustrations of the two scenarios.

For intra-satellite handovers, the TA between the client device 100 and the target cell may be similar to the current TA between the client device 100 and the serving cell, because the propagation distance may be similar. For example, in the example embodiment of FIG. 5, d1≈d2. On the contrary, for inter-satellite handovers, the TA may be significantly different due to the large physical separation between a serving 200_1 and a target 200_2 network node device due to them being on different satellites. For example, in the example embodiment of FIG. 5, d3≠d4.

Due to the properties of these two scenarios and the properties of the 2/4-step RA procedures, the 2-step RA procedure may be well suited for intra-satellite handovers, where there may be no need to adjust the TA. Moreover, the 4-step RA procedure may be better suited for inter-satellite handovers where a new TA value needs to be set for the target cell.

Therefore, it may be beneficial to use either the 2-step or the 4-step RA procedure depending on the scenario. The 2-step RA procedure may provide improved access latency but increased resource consumption, while the 4-step RA procedure may provide reduced resource consumption but increased access latency.

At least some example embodiments disclosed herein may address the problem of how to choose the RA procedure based on inter-/intra-satellite handover (HO) conditions.

To address the problem of the different RA procedures being better in different NTN handover scenarios (inter/intra-satellite), methods are proposed herein to signal from the network node device 200 to the client device 100 what type of RA procedure to use in a given situation. The signaling may be implicit or explicit.

The explicit signaling may target radio resource control (RRC) connected client devices 100 about to perform a handover. When the network node device 200 sends the RRC Reconfiguration message to initiate the handover (valid for both conventional handover and conditional handover) 2 bits may be included to configure the RA procedure. The 2 bits may signal to the client device 100 the selection among different RA procedures, such as the 4-step RA procedure, the 2-step RA procedure, and the 4-step RA procedure with an extended RA preamble.

The implicit signaling of RA procedure is valid for both RRC Connected (performing handover) and Idle/Inactive client devices 100 (performing cell re-selection).

The implicit signaling may be achieved by using Physical Cell Identities to determine whether the RA is intra- or inter-satellite. The Physical Cell ID (or other cell/gNB IDs) can be combined with ephemeris or broadcast information to inform the client device 100 about what satellite they belong to. Satellite ID, conveyed as system broadcast, can be used to determine whether the two PCIs belong to the same satellite.

Alternatively or additionally, the implicit signaling may be achieved by using client device radio measurements. For example, if the Synchronization Signal & PBCH blocks (SSBs) of the previous cell and of the target cell are synchronized in time, the client device 100 may assume the cells originate from the same satellite.

According to an example embodiment, the at least one memory 102 and the computer program code are further configured to, with the at least one processor 100, cause the client device 100 to before performing the first or the second TA procedure, perform time synchronization using a synchronization signal source external to the NTN. The synchronization signal source external to the NTN may comprise, for example, Global Navigation Satellite System (GNSS) radio.

For RRC Idle/Inactive UEs to use the 2-step RA procedure, they may rely on an external source for time synchronization (e.g. a Global Navigation Satellite System radio), because they do not receive TA commands from the camping cell. With a GNSS receiver the client device 100 may still need to have a fairly accurate timing acquired first (or continuously) before it initiates the HO/RA. Alternatively, if the client device 100 was moved from RRC Connected to RRC Idle/Inactive client device 100 within a preconfigured time window, the client device 100 may assume that the last TA from the serving cell is still valid. Since the RRC Idle/Inactive client devices 100 may need to keep track of time to determine paging occasions and measurement instances, it may also be feasible to rely on this in order to utilize 2-step RA.

Figure 6:
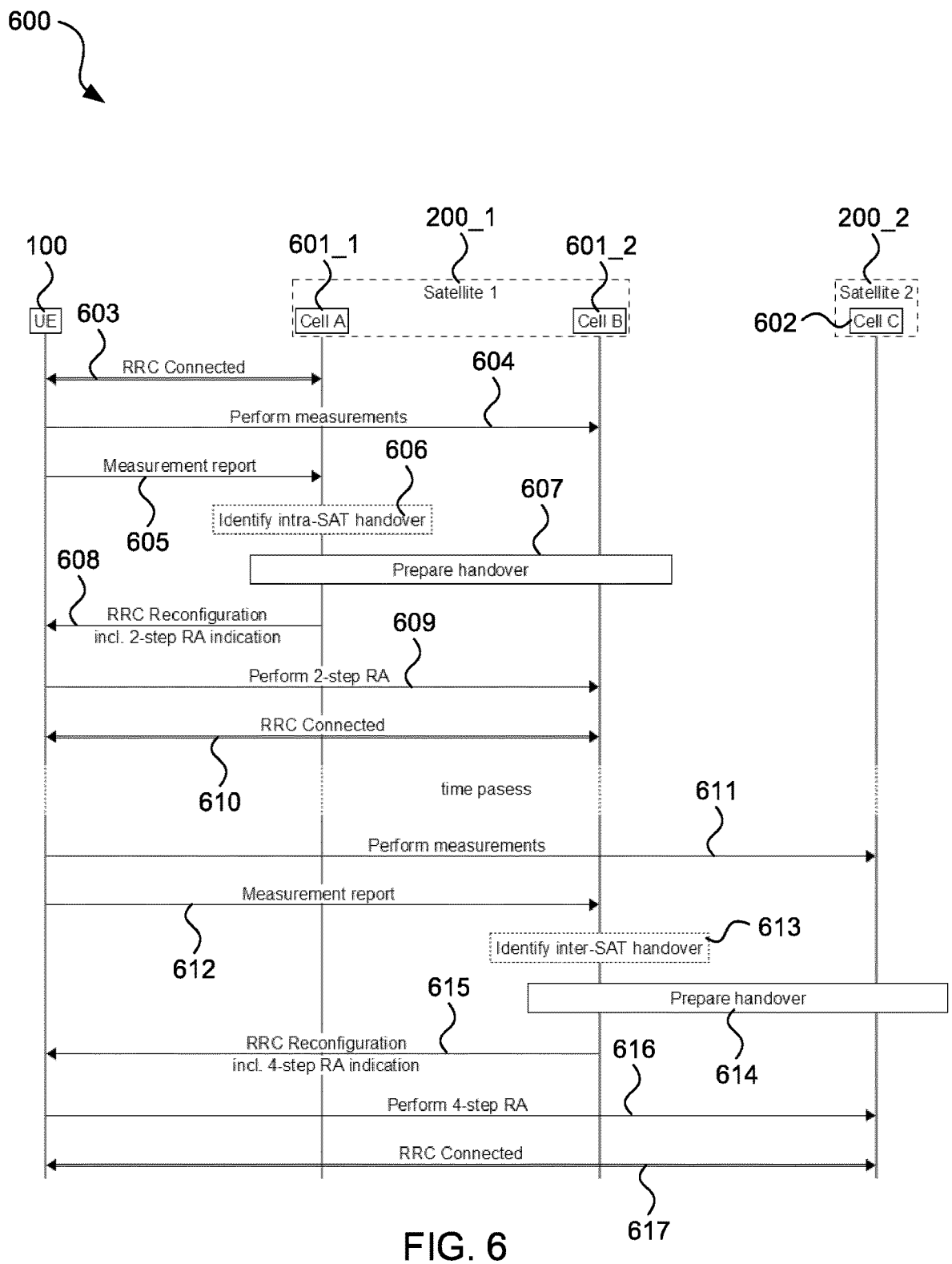
FIG. 6 illustrates another example embodiment of the subject matter described herein illustrating a signaling diagram.

FIG. 6 illustrates a signaling diagram 600 for explicit RA procedure signaling according to an example embodiment.

The client device 100 may be RRC connected 603 to a first cell 601_1 of a first network node device 200_1.

According to an example embodiment, the information related to the target cell comprises reference signal received power, RSRP, measurement results. The client device 100 may, for example, transmit a measurement report to the network node device 200.

The client device 100 may perform measurements 604 on a second cell 601_2 of the first network node device 200_1 and transmit a measurement report 605 to the first network node device 200_1 via the first cell 601_1.

Based on the measurement report 605, the first network node device 200_1 may identify 606 an intra-satellite handover and prepare 607 the cell handover between the first cell 601_1 and the second cell 601_2 of the first network node device 200_1.

The first network node device 200_1 may then transmit a configuration message 608 to the client device 100. The configuration message 608 may indicate that the client device 100 should use the 2-step RA procedure for the cell handover. The client device 100 may then perform the 2-step RA procedure 609 with the second cell 601_2 the first network node device 200_1 and become RRC connected 610 with the second cell 601_2.

After some time, the client device 100 may perform measurements 611 on a cell 602 of a second network node device 200_2 and transmit a measurement report 612 to the first network node device 200_1 via the second cell 601_2 of the first network node device 200_1.

Based on the measurement report 612, the first network node device 200_1 may identify 613 that the handover between the second cell 601_2 of the first network node device 200_1 and the cell 602 of the second network node device 200_2 is an inter-satellite handover. The first network node device 200_1 may then prepare 614 the handover between the second cell 601_2 of the first network node device 200_1 and the cell 602 of the second network node device 200_2.

The first network node device 200_1 may then transmit a configuration message 615 to the client device 100 via the second cell 601_2. The configuration message 615 may indicate that the client device 100 should use the 4-step RA procedure for the handover. The client device 100 may then perform the 4-step RA procedure 616 with the cell 602 of the second network node device 200_2 and become RRC connected 617 with the cell 602 of the second network node device 200_2.

The configuration messages 608, 615 may comprise, for example, a radio resource control (RRC) Reconfiguration message.

According to an example embodiment, the at least one memory 102 and the computer program code are further configured to, with the at least one processor 101, cause the client device to 100 receive a configuration message from a network node device triggering the RA procedure and identify whether the needed RA is intra-satellite or inter-satellite based on the received configuration message. The configuration message may comprise, for example, a paging, a request from the network node device 200, or a request for other System Information (SI).

For example, in the example embodiment of FIG. 6, configuration message 608 may indicate to the client device 100 that the handover is intra-satellite and/or that the client device 100 should use the 2-step RA procedure. On the other hand, in the example embodiment of FIG. 6, configuration message 615 may indicate to the client device 100 that the handover is inter-satellite and/or that the client device 100 should use the 4-step RA procedure.

The network node device 200 may issue a handover command to the client device 100 where the network node device 200 includes RA configuration, such as preamble and occasion indices, together with the handover command. Handover configuration message may comprise an RA preamble index and/or PRACH occasion which implicitly indicate the RA procedure to be used by the client device 100.

According to an example embodiment, the configuration message comprises dedicated bits indicating RA procedure to be used by the client device 100.

The explicit signaling of the RA procedure through the configuration message 608, 615 may also apply to conditional handover. One difference may be that the client device 100 does not initiate the handover immediately after receiving the RRC Reconfiguration message.

An alternative RA procedure selection indication can be performed by the network node device 200 for the RRC Connected client device 100 by indicating to the client device 100 a specific set/range of parameters to use for the RA. For example, the following two can be used. prach-ConfigurationIndex: the available set of PRACH occasions for the transmission of the Random Access Preamble. ra-PreambleIndex: Random Access Preamble.

In an example embodiment, the ra-PreambleIndex may be split in two groups, where an index belong to the first group indicates 4-step RA, while an index of the second group indicated 2-step RA.

Figure 7:
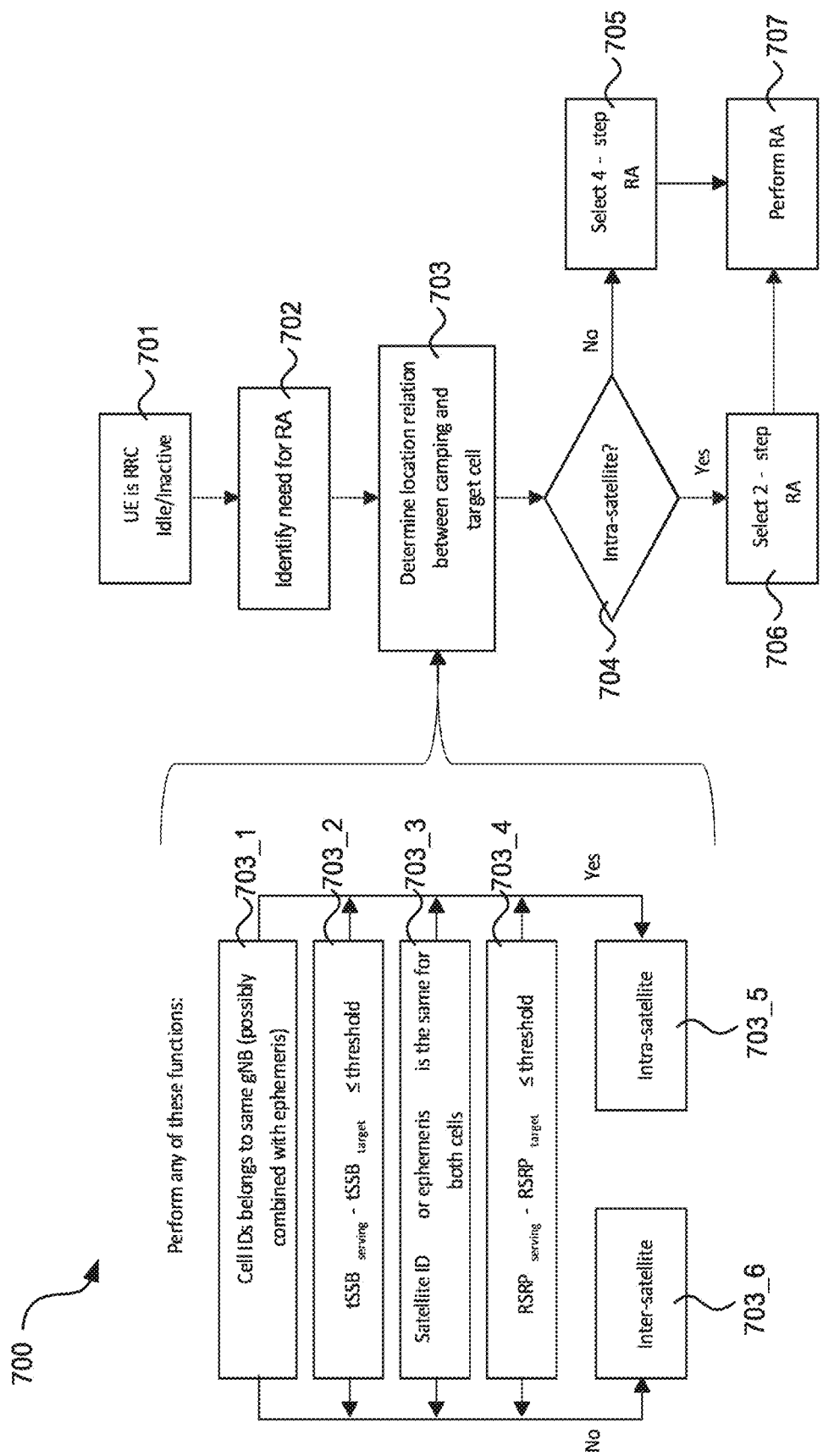
FIG. 7 illustrates another example embodiment of the subject matter described herein illustrating a flow chart.

FIG. 7 illustrates a flow chart 700 representation of RA procedure selection according to an example embodiment.

The client device 100 may be RRC Idle/Inactive. This may be applicable, when the client device 100 prepares to transition to RRC Connected if it e.g. has data to transmit or has received a paging message.

The client device 100 may be idle/inactive 701. The client device 100 may then detect 702 need for RA. The client device 100 may need RA for, for example, switching to RRC connected mode from the idle/inactive mode.

The client device 100 may then identify 703 a location relation between a previous cell and the target cell in order to deduce 704 whether the RA is intra-satellite or inter-satellite.

For example, if the previous cell to which the client device 100 was connected to is provided by a different network node device 200/satellite than the target cell, the client device 100 may deduce that the RA is intersatellite. On the other hand, if the target cell and the previous cell to which the client device 100 was connected to are provided by the same network node device 200/satellite, the RA may be intra-satellite.

Since the client device is idle/inactive, the target cell may be referred to as a camping cell.

If the cell reselection is intra-satellite, the client device 100 may select 706 the 2-step RA procedure. If the cell reselection is inter-satellite, the client device 100 may select 705 the 4-step RA procedure. The client device 100 may then perform 707 the selected RA procedure.

The client device 100 may identify 703 the location relation between the previous cell and the target cell in various ways.

The client device 100 may check 703_1 whether cell identifications (IDs) of the previous cell and of the target cell belong to the same network node device 200. If they do, the client device 100 may deduce that cell reselection is intra-satellite 703_5. If they do not, the client device 100 may deduce that cell reselection is inter-satellite 703_6. The client device 100 may combine this with ephemeris information.

Alternatively or additionally, the client device 100 may compare 703_2 SSB timings of the previous cell and of the target cell. The client device 100 may, for example, compare if difference between the SSB timings is less than a preconfigured threshold. The preconfigured threshold may be configured by the network node device 200. If it is, the client device 100 may deduce that cell reselection is intra-satellite 703_5. If it is not, the client device 100 may deduce that cell reselection is inter-satellite 703_6.

Alternatively or additionally, the client device 100 may check 703_3 whether the satellite IDs and/or ephemeris is the same for the previous cell and for the target cell. If they do, the client device 100 may deduce that cell reselection is intra-satellite 703_5. If they do not, the client device 100 may deduce that cell reselection is inter-satellite 703_6.

Alternatively or additionally, the client device 100 may compare 703_4 RSRP/RSRQ of the previous cell and of the target cell. The client device 100 may, for example, compare if difference between the RSRPs/RSRQs is less than a preconfigured threshold. If it is, the client device 100 may deduce that cell reselection is intra-satellite 703_5. If it is not, the client device 100 may deduce that cell reselection is inter-satellite 703_6.

According to an example embodiment, the at least one memory 102 and the computer program code are further configured to, with the at least one processor 101, cause the client device 100 to identify whether the needed RA is intra-satellite or inter-satellite by performing at least one of:

compare at least one identifier related to the previous cell and at least one identifier related to the target cell; compare reference signal receive power/quality of the previous cell and of the target cell; compare time synchronization of synchronization signals and/or reference signals and/or broadcast channels of the previous cell and of the target cell; or compare physical location and/or movement trajectory of the previous cell and of the target cell.

According to an example embodiment, the at least one identifier comprises at least one of: cell global identifier, gNB identifier, global gNB identifier, physical cell identifier, satellite identification.

Regarding the use of network identities for implicit RA selection by RRC Connected and Idle/Inactive client devices 100, for example the following relevant identities may be used: Physical Cell IDs (PCIs), NR Cell Global Identifier (NCGI): used to identify NR cells globally. The NCGI is constructed from the PLMN identity the cell belongs to and the NR Cell Identity (NCI) of the cell, gNB Identifier (gNB ID): used to identify gNBs within a PLMN. The gNB ID is contained within the NCI of its cells, Global gNB ID: used to identify gNBs globally. The Global gNB ID is constructed from the PLMN identity the gNB belongs to and the gNB ID. The MCC and MNC are the same as included in the NCGI.

The (global) gNB ID can thus be used by the client device 100 to determine whether two cells, identified by the NCI, belong to the same gNB. Alternatively, the mobile network operator may plan the network in such a way that the client device 100, by detecting PCIs of the serving and target cells, can deduct whether it is an intra- or inter-satellite handover/cell reselection. This may further be complemented with the use of ephemeris information, which in one instance can notify the client device 100 about which PCIs belong to the same satellite. Thus, if a client device 100 detects PCI A, the client device 100 can deduce whether PCI B originates from the same satellite. Such PCI grouping information may also be shared through System Information broadcast, e.g. the serving cell will broadcast what PCIs are collocated with it.

In general, the fallback procedures described herein may be applied to any example embodiment. For example, when the 2-step RA procedure has failed a number of times n, then the client device 100 may fallback to using the 4-step RA procedure.

The selection between 2/4-step RA procedure may also apply to terrestrial networks for inter/intra-site handovers, i.e. depending on whether target and serving cell are transmitted from the same physical location.

Figure 8:
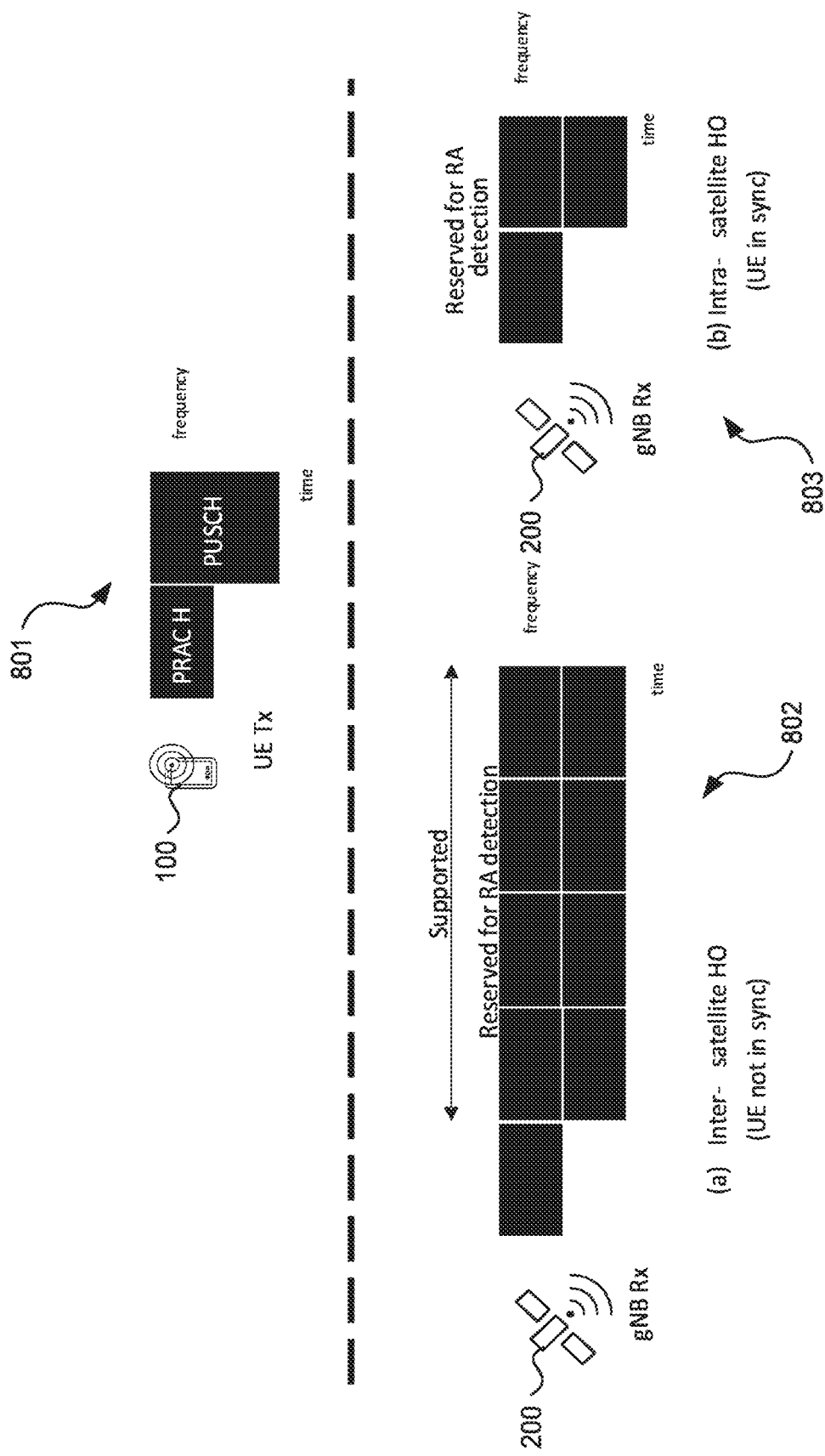
FIG. 8 illustrates another example embodiment of the subject matter described herein illustrating time-frequency resource usage.

FIG. 8 illustrates a schematic representation of time-frequency resource usage according to an example embodiment. The example embodiment illustrates the time-frequency resources a network node device 200 may need to reserve when a client device 100 is using 2-step RA procedure and depending on whether the client device 100 is time-synchronized (e.g. through TA commands) or not.

As previously mentioned, the client device 100, using the 2-step RA procedure may transmit in both the PRACH and PUSCH channels 801. If the client device 100 is not time-synchronized, the network node device 200 may need to allocate a large receiving window 802 compared to the synchronized scenario, where the network node device 200 may need to allocate a smaller receiving window 803.

The needed window size Δt may depend at least on the propagation from client device 100 to network node device 200. For regenerative satellites, the Δt may be quite small if d1 and d2 are similar as indicated in the example embodiment of FIG. 5 (i.e. elevation angles for serving and target cell is similar), but it can also be different if the link to one satellite is blocked (i.e. elevation angle is different due to an obstacles, such as buildings/mountains, or if the satellites are on different orbits. For transparent satellites, the feeder link path (connection between satellite and NTN gateway, connecting to the network node device 200) may be quite different for target and serving cell and thus the required Δt may be large.

Selecting the appropriate 2/4-step RA procedure may be advantageous, because each of the procedures may be beneficial in different scenarios.

Using the 2-step RA procedure for intra-satellite cell handover/cell reselection may reduce the latency before payload data can be transferred. A further advantage of using the 2-step RA procedure, when the TA is (almost) valid may be that the guard time can be reduced, which may lead to reduced resource reservation.

Using the 4-step RA procedure for inter-satellite handover can limit the resource usage and guard time compared to using 2-step RA procedure (which may not have time alignment).

At least some example embodiments disclosed herein may allow flexibility in the configuration from the network side and may allow different client devices 100 to choose an appropriate RA procedure depending on their individual scenarios.

At least some example embodiments disclosed herein may be useful for reducing the impact of massive RA by not allowing all client devices 100 to perform the same type of RA procedure.

At least some example embodiments disclosed herein may reduce RA resource allocation.

Figure 9:
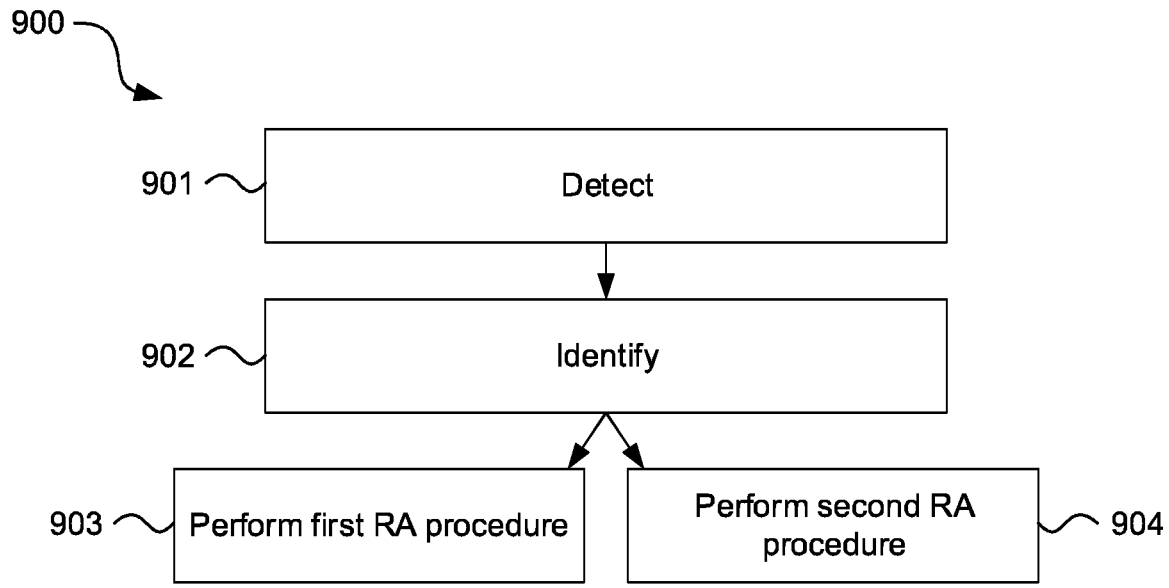
FIG. 9 illustrates another example embodiment of the subject matter described herein illustrating a flow chart of a method.

FIG. 9 shows an example embodiment of the subject matter described herein illustrating a method 900. The method 900 may be performed by, for example, the client device 100.

According to an example embodiment, the method 900 comprises detecting 901 need of a client device for random access, RA, in a non-terrestrial network (NTN) to a tar-get cell of the NTN.

The method 900 may further comprise identifying 902 whether the needed RA is intra-satellite or inter-satellite.

The method 900 may further comprise, in response to the needed RA being intra-satellite, performing 903 a first RA procedure, wherein, in the first RA procedure, the client device transmits an RA preamble and a payload data in a single message.

The method 900 may further comprise, in response to the needed RA being inter-satellite, performing 904 a second RA procedure wherein, in the second RA procedure, the client device transmits an RA preamble and a payload data in separate messages.

Figure 10:
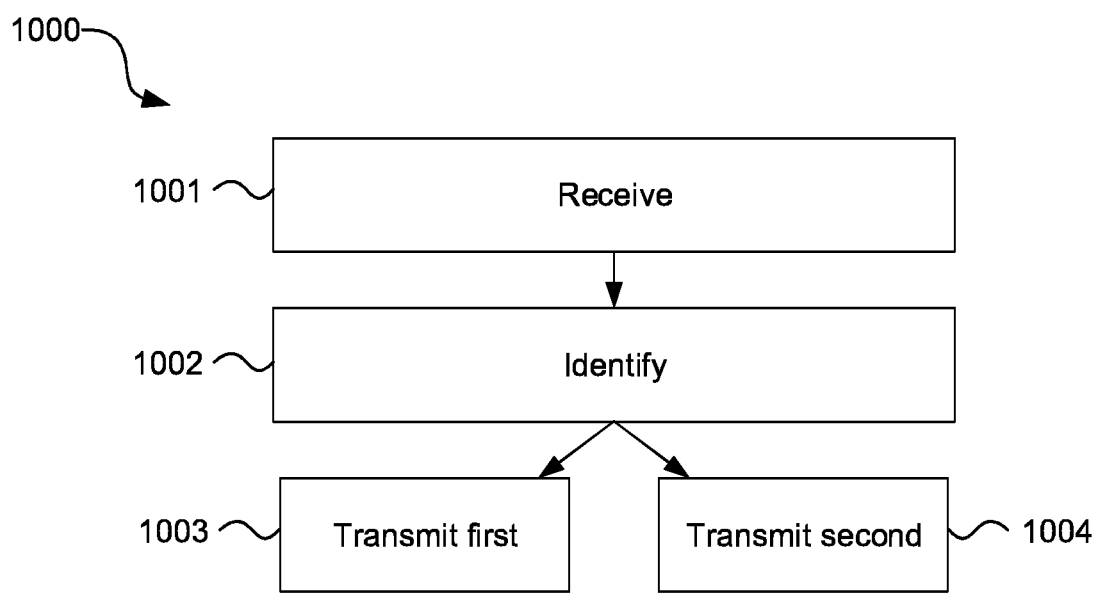
FIG. 10 illustrates another example embodiment of the subject matter described herein illustrating a flow chart of another method.

FIG. 10 shows an example embodiment of the subject matter described herein illustrating a method 1000. The method 1000 may be performed by, for example, the network node device 200.

According to an example embodiment, the method 1000 comprises receiving 1001 information related to a target cell of a non-terrestrial network (NTN) from a client device needing random access (RA) to the target cell.

The method 1000 may further comprise identifying 1002 whether the RA is intra-satellite or inter-satellite based at least on the received information.

The method 1000 may further comprise, in response to the needed RA being intra-satellite, transmitting 1003 a configuration message to the client device instructing the client device to perform a first RA procedure, wherein, in the first RA procedure, the client device transmits an RA preamble and a payload data in a single message.

The method 1000 may further comprise, in response to the needed RA being inter-satellite, transmitting 1004 a configuration message to the client device instructing the client device to perform a second RA procedure, wherein, in the second RA procedure, the client device transmits an RA preamble and a payload data in separate messages.

It is to be understood that the order in which operations 901-904 and/or 1000-1004 are performed, may vary from the example embodiment depicted in FIGS. 9 and 10.

The method 900 may be performed by the client device 100 of FIG. 1. The method 1000 may be performed by the network node device 200 of FIG. 2. Further features of the methods 900, 1000 directly result from the functionalities and parameters of the client device 100 and/or the network node device 200. The methods 900, 1000 can be performed by computer program(s).

An apparatus may comprise means for performing any aspect of the method(s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the client device 100 and/or network node device 200 comprise a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A client device, comprising:
   at least one processor; and
   at least one memory including computer program code;
   the at least one memory and the computer program code configured to, with the at least one processor, cause the client device to:
   detect a need for random access in a non-terrestrial network to a target cell of the non-terrestrial network based on a need for the client device to switch from an idle or inactive mode to a connected mode;
   identify a location relation between a previous cell and the target cell;
   based on the location relation, identify whether the needed random access is intra-satellite or inter-satellite, wherein the identification is based on the following:
      comparing at least of identifier related to a previous cell and at least one identifier related to the target cell, wherein the at least one identifier comprises gNB identifier or global gNB identifier;
      comparing a reference signal receive power and quality of the previous cell and of the target cell;
      comparing a time synchronization of synchronization signals and reference signals; and
      comparing broadcast channels of the previous cell and of the target cell, wherein the previous cell corresponds to a cell that the client device was last active in and the target cell corresponds to a camping cell of the client device;
   in response to the needed random access being intra-satellite, perform a first random access procedure, wherein, in the first random access procedure, the client device transmits a random access preamble and a payload data in a single message; and in response to the needed random access being inter-satellite, perform a second random access procedure wherein, in the second random access procedure, the client device transmits the random access preamble and the payload data in separate messages.

2. The client device according to claim 1, wherein the at least one memory and the computer program code are further configured to, with the at least one processor, cause the client device to:

detect the need for random access based further on a need for a handover; and perform the needed handover using the first or the second random access procedure.

3. The client device according to claim 2, wherein the at least one memory and the computer program code are further configured to, with the at least one processor, cause the client device to:

in response to the first random access procedure failing a configured number of times, perform the second random access procedure.

4. The client device according to claim 2, wherein the at least one memory and the computer program code are further configured to, with the at least one processor, cause the client device to:

transmit the random access preamble using physical random-access channel; and transmit the payload data using physical uplink shared channel.

5. The client device according to claim 4, wherein the at least one memory and the computer program code are further configured to, with the at least one processor, cause the client device to:

receive a configuration message from the network node device triggering the first random access procedure or the second random access procedure; and identify whether the needed random access is intra-satellite or inter-satellite based on the received configuration message.

6. The client device according to claim 5, wherein the random access configuration message comprises dedicated bits indicating either the first random access procedure or the second random access procedure to be used by the client device.

7. The client device according to claim 6, wherein the at least one memory and the computer program code are further configured to, with the at least one processor, cause the client device to:

before performing the first random access procedure or the second random access procedure, perform time synchronization based on a synchronization signal source external to the non-terrestrial network.

8. A method, comprising:

detecting a need of a client device for random access in a non-terrestrial network to a target cell of the non-terrestrial network based on a need for the client device to switch from an idle or inactive mode to a connected mode;

identifying a location relation between a previous cell and the target cell;

based on the location relation, identifying whether the needed random access is intra-satellite or inter-satellite, wherein the identification is based on the following:

comparing at least of identifier related to a previous cell and at least one identifier related to the target cell, wherein the at least one identifier comprises gNB identifier or global gNB identifier;

comparing a reference signal receive power and quality of the previous cell and of the target cell;

comparing a time synchronization of synchronization signals and/or reference signals; and comparing broadcast channels of the previous cell and of the target cell, wherein the previous cell corresponds to a cell that the client device was last active in and the target cell corresponds to a camping cell of the client device;

in response to the needed random access being intra-satellite, performing a first random access procedure, wherein, in the first random access procedure, the client device transmits a random access preamble and a payload data in a single message; and in response to the needed random access being inter-satellite, performing a second random access procedure wherein, in the second random access procedure, the client device transmits the random access preamble and the payload data in separate messages.

9. The method according to claim 8, further comprising:

detecting the need for random access based further on a need for a handover; and performing the needed handover using the first or the second random access procedure.

10. The method according to claim 8, further comprising:

in response to the first random access procedure failing a configured number of times, performing the second random access procedure.

11. The method according to claim 9, further comprising:

transmitting the random access preamble using physical random-access channel; and transmitting the payload data using physical up-link shared channel.

12. The method according to claim 8, further comprising:

receiving a configuration message from the network node device triggering the first or second random access procedure; and identifying whether the needed random access is intra-satellite or inter-satellite based on the received configuration message.

13. The method according to claim 12, wherein the random access configuration message comprises dedicated bits indicating either the first or second random access procedure to be used by the client device.

14. The method according to claim 8, further comprising:

before performing the first or the second random access procedure, performing time synchronization based on a synchronization signal source external to the non-terrestrial network.

15. A computer program embodied on a non-transitory computer-readable medium, said computer program comprising program code configured to cause a computer to perform the method according to claim 8, when the computer program is executed on the computer.

16. A network node device, comprising:

at least one processor; and at least one memory including computer program code;

the at least one memory and the computer program code configured to, with the at least one processor, cause the network node device to:

receive information related to a target cell of a non-terrestrial network from a client device needing random access to the target cell;

detect a need for random access in the non-terrestrial network to the target cell of the non-terrestrial network based on a need for the client device to switch from an idle or inactive mode to a connected mode;
identify a location relation between a previous cell and the target cell;
based on the location relation, identify whether the random access is intra-satellite or inter-satellite based at least on the received information and the location relatoin, wherein the identification is based the following:
    comparing at least of identifier related to a previous cell and at least one identifier related to the target cell, wherein the at least one identifier comprises gNB identifier or global gNB identifier;
    comparing a reference signal receive power and quality of the previous cell and of the target cell;
    comparing a time synchronization of synchronization signals and/or reference signals; and
    comparing broadcast channels of the previous cell and of the target cell, wherein the previous cell corresponds to a cell that the client device was last active in and the target cell corresponds to a camping cell of the client device;
in response to the needed random access being intra-satellite, transmit a configuration message to the client device instructing the client device to perform a first random access procedure, wherein, in the first random access procedure, the client device transmits a random access preamble and a payload data in a single message; and
in response to the needed random access being inter-satellite, transmit a configuration message to the client device instructing the client device to perform a second random access procedure, wherein, in the second random access procedure, the client device transmits the random access preamble and the payload data in separate messages.

\* \* \* \* \*